United States Patent [19]

Boman

[11] Patent Number: 5,227,712
[45] Date of Patent: Jul. 13, 1993

[54] POWER SUPPLY FOR A BATTERY CHARGER
[75] Inventor: Bertho K. Boman, Plantation, Fla.
[73] Assignee: Motorola, Inc., Schaumburg, Ill.
[21] Appl. No.: 720,999
[22] Filed: Jun. 26, 1991
[51] Int. Cl.$^5$ .................... H01M 10/44; H01M 10/46
[52] U.S. Cl. ...................................... 320/21; 323/244
[58] Field of Search ...................... 320/21, 32, 35, 39; 323/235, 237, 244, 236, 245, 246, 319, 320; 363/44, 89

[56] References Cited
U.S. PATENT DOCUMENTS

| Re. 33,184 | 3/1990 | Westfall et al. | 323/235 X |
| 4,321,523 | 3/1982 | Hammel | 320/14 |
| 4,472,672 | 9/1984 | Pacholok | 320/21 |
| 4,549,127 | 10/1985 | Taylor et al. | 320/212 |
| 4,564,800 | 1/1986 | Jurjans | 320/36 |
| 4,829,225 | 5/1989 | Podrazhansky et al. | 320/14 |

Primary Examiner—R. Skudy
Assistant Examiner—E. To
Attorney, Agent, or Firm—Robert S. Babayi

[57] ABSTRACT

A power supply (100) includes an energy source (102) which provides cyclically varying supply voltage having periodic repeated beginning points. Generally, the beginning points comprise zero potential points of the cyclically varying supply voltage. The energy source is coupled to an energy control means (106) which is responsive to a control setting for controlling an output (108). A controller (114) provides the control setting in response to a feedback signal received from a sensor (116) only at the beginning points and maintains control of the control setting constant until a subsequent beginning point.

23 Claims, 2 Drawing Sheets

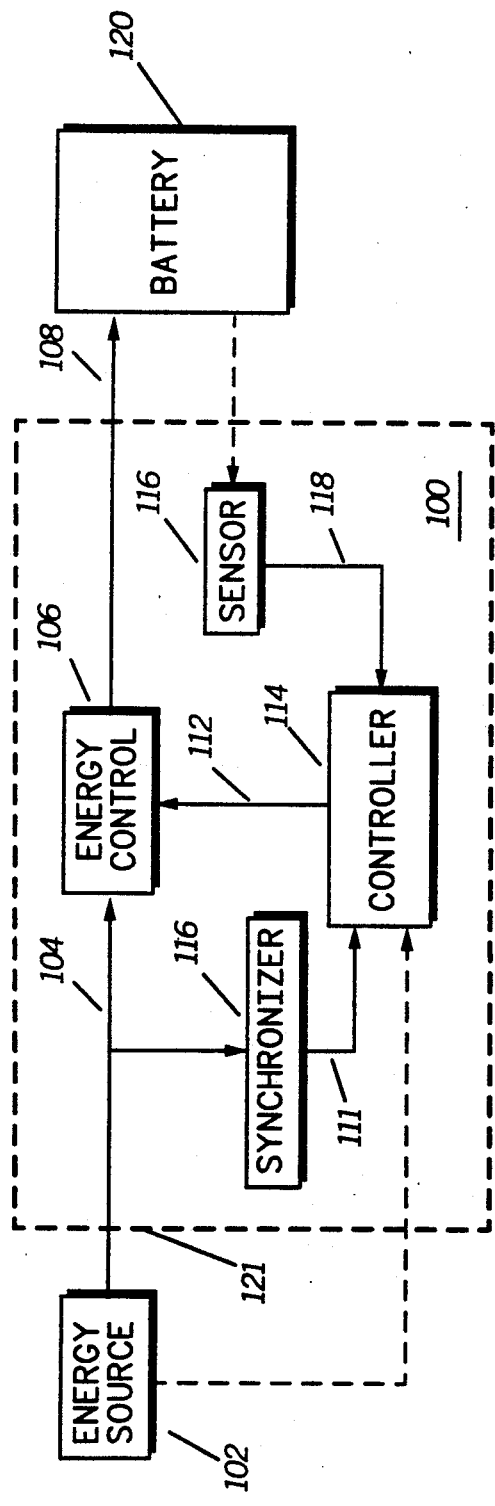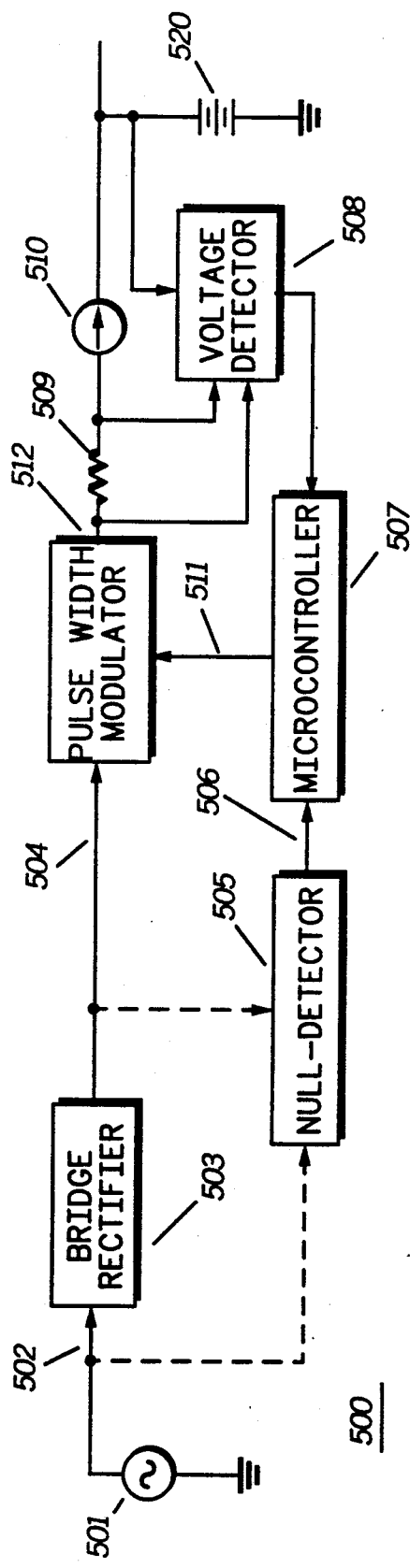

POWER SUPPLY FOR A BATTERY CHARGER

TECHNICAL FIELD

This invention relates generally to the field of power supplies and in particular to power supplies suitable for use in battery chargers.

BACKGROUND

Battery chargers provide current to charge batteries in a wide variety of applications, such as in the field of communications, for charging batteries of portable radios. A battery charger generally includes a power supply which provides the charging current. One of the specifications of the power supply is power factor, which must be optimized to provide a desirable performance. In power supply terminology, power factor generally relates to the phase relationship of the source voltage and the harmonic current content. Ideally, a substantially in-phase relationship and a low harmonic current content is desired so that the power supply presents a substantially resistive load to the line source. Resistive loading of the line source prevents repetitive current spikes from being produced on the line source.

In conventional power supplies, a cyclically varying supply voltage is rectified by a rectifier, the output of which is coupled to a substantially large filtering capacitor in order to produce a rippled DC supply voltage. The DC voltage across the filtering capacitor is generally coupled to a regulator to provide a ripple-free DC voltage. Due to the filtering capacitor, high peak in-rush currents are produced when the power supply is turned on. These in-rush currents must be suppressed to avoid overstressing the power supply and the line input.

Additionally, the capacitive filtering of the rectified voltage substantially degrades the power factor of the power supply. In this arrangement, charging the filtering capacitor produces harmonic current spikes which must be suppressed or somehow controlled in order to improve performance of the power supply.

Several methods have been devised for controlling the in-rush currents. One such method comprises adding a series resistor which extends charge time constant of the filtering capacitor. However, this method significantly reduces efficiency of the supply and produces substantial heat which must be dissipated through elaborate packaging techniques. Alternatively, in order to improve efficiency, a thermistor can be used instead of the resistor to lower the resistance in accordance with the rise in temperature. However, upon occurrence of a power glitch or a fast on/off, this scheme may be ineffective when the thermistor is already heated up.

Switching power supplies generally use a pulse width modulator where the output voltage is regulated by varying pulse width or a duty cycle of the output signal. In some applications, the pulse width is varied by varying the switching rate of the pulse width modulator. In this arrangement, any changes in the input voltage or the output voltage cause an instantaneous change in switching duty cycle which causes instantaneous changes in the current being drawn by the supply. The instantaneous current change substantially increases the harmonic current contents and, therefore, degrades the power factor. Some switching supplies include a pre-switcher coupled between the rectifier and the capacitive filter to improve the power factor. However, addition of the pre-switcher significantly increases cost and complexity of the power supply.

Another method for controlling harmonic current spikes comprises adding a very large inductor to create an inductive input circuit. However, the inductor itself introduces a substantial phase shift which degrades the power factor.

It is, therefore, desired to provide a power supply which has a substantially improved power factor and avoids the expense and the complexity of prior art approaches.

SUMMARY OF THE INVENTION

Briefly, according to the invention, a power supply for providing an output signal includes an input for receiving a cyclically varying supply voltage having periodic repeating beginning points, a synchronization means which synchronizes with the cyclically varying supply voltage, an energy control means coupled to the energy source to control the output signal in response to a control setting, and a controller means for providing the control setting. The controller means is responsive to the synchronization means for varying the control setting only at the beginning point and for maintaining the control setting constant until a subsequent beginning point.

BRIEF DESCRIPTION OF THE DRAWINGS

FIG. 1 is a block diagram of a power supply which utilizes the principals of the present invention.

FIG. 5 is a block diagram of a battery charger according to the principals of the present invention.

DETAILED DESCRIPTION OF THE PREFERRED EMBODIMENT

Figure 2A:
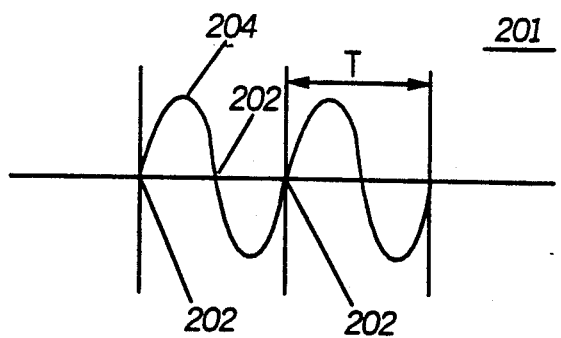
FIGS. 2 A-B are exemplary diagrams of cyclically varying sources for the power supply of FIG. 1.

Referring to FIG. 1, a block diagram of a power supply 100, according to the present invention, is shown. The power supply 100 is designed to provide an output 108, the variations of which have a minimal effect on the phase relationship of input current source and input voltage source. Therefore, if the output 108 is varied for any reason, the input voltage and the input current remain in phase and the power supply 100 presents a substantially resistive impedance to an external energy source regardless of any power supply output variations.

The power supply 100 is contemplated for use in a variety of power control applications across any suitable load in which an optimum power factor is essential. In a battery charger application, for example, output 108 of the power supply 100 is generally varied to maintain an average charging current for a battery 120. Moreover, the charging current may be increased or decreased according to the voltage across the battery 120 or charging current. The variations of the output 108 may be sensed by a sensor 116. The sensor 116 acts as a feedback means to feedback the variations for controlling the output 108. The sensor 116 may also comprise any suitable sensor for sensing the battery temperature of the battery. In this arrangement, the output signal 108 is controlled based on temperature variations.

The sensor also comprises a voltage sensor for sensing the battery voltage. In the preferred embodiment of the invention, all charging current, battery voltage, and temperature variables are sensed. The sensor 116 provides a feedback signal 118 in accordance with the variables being sensed for controlling the output signal 108. In other power control applications, the sensor may be used to sense any number of variables which are affected by the output 108. Such variables may include ambient light, ambient temperature, liquid level, etc. Furthermore, as will be described herein, the output 108 may be varied to compensate for input source variations.

The power supply 100 includes an input 121 being coupled with an energy source 102 for receiving a cyclically varying supply voltage on line 104. The energy source 102 may comprise an AC line source, a rectified signal source, or any suitable source having an output signal which is periodically repeated.

Figure 2B:
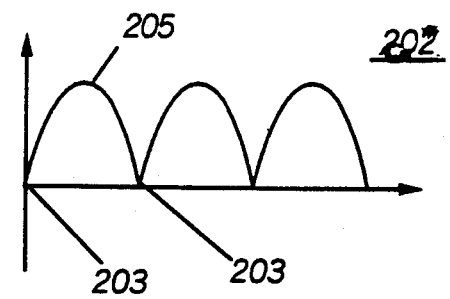

FIGS. 2A and 2B show two typical waveforms 201 and 202 for the cyclically varying supply voltage. In FIG. 2A, the waveform 201 comprises a sinusoidal waveform which may be representing an AC line voltage having a period T. The waveform 201 has beginning points 202 and peak points 204. The waveform 202 (FIG. 2B) comprises a cyclical fullwave rectified signal which is produced by rectifying a sinusoidal signal via a bridge rectifier (or a fullwave rectifier). The waveform 202 also has periodic repeating beginning points 203 and peak points 205. Generally, it is assumed for the purpose of this invention, that the beginning of each cycle occurs at or near a null potential. However, it is also contemplated that the cyclically varying supply voltage may have an average DC potential. With this type of source, the beginning points may comprise points where the waveform is at the DC potential.

Referring back to FIG. 1, the cyclically varying supply voltage is applied to a synchronizer 116 which synchronizes therewith to provide an synchronization signal 111. The synchronizer 116 may comprise any well-known zero crossing detector or null detector which produces pulses at a rate corresponding to the cyclically varying supply frequency. The synchronization signal 111 is then applied to a controller 114 which may comprise any suitable microprocessor controller to indicate the beginning of each cycle. The controller 114 is responsive to the feedback signal 118 and/or cyclically varying voltage variations to provide a control setting (on line 112) which is applied to an energy control means 106 to control the output 108. It is contemplated that the energy control means as herein referred includes a broad range of devices which have the capability of controlling the energy or power contents of the cyclically varying supply voltage. The energy contents may be controlled by controlling either the amplitude or the duty cycle of the energy control means output.

Figure 3A:
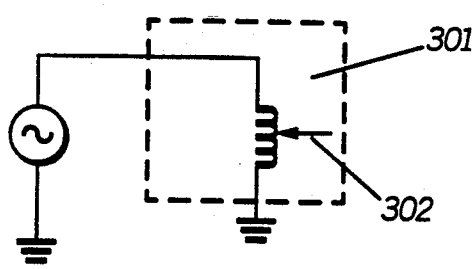
FIGS. 3 A-C are exemplary embodiments of energy control means included in the power supply of FIG. 1.
Figure 4A:
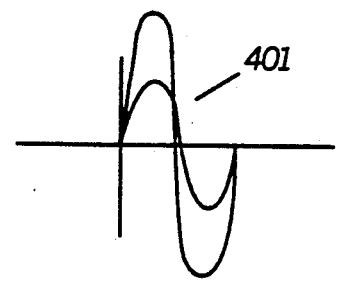
FIGS. 4 A-C are exemplary diagrams of outputs corresponding to energy control means of FIGS. 3 A-C.
Figure 3B:
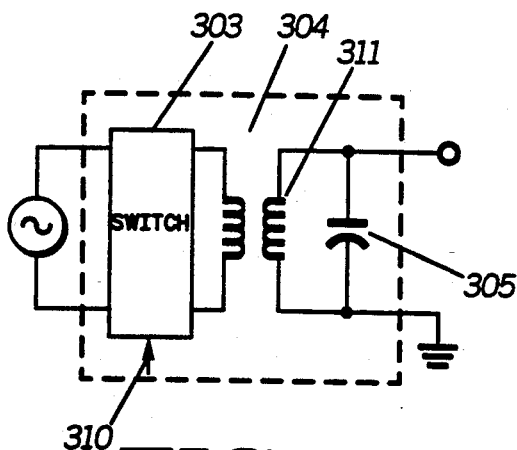
Figure 4B:
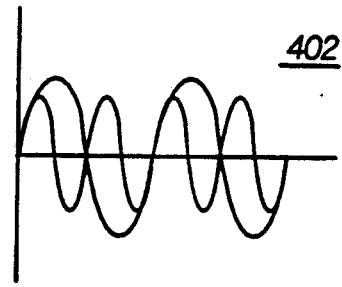
Figure 3C:
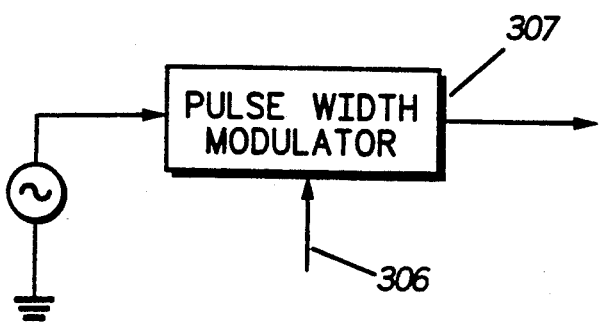
Figure 4C:
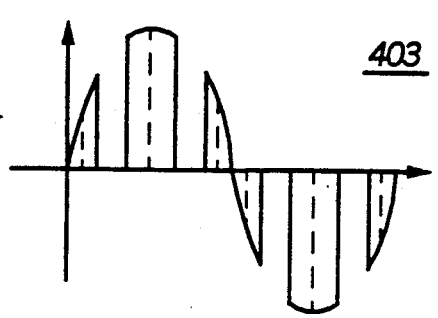

Referring to FIGS. 3A-3C, some exemplary embodiments of the energy control means 106, which are suitable for the purpose of the present invention, are shown. FIGS. 4A-4C show the respective control means outputs of the embodiments shown in FIGS. 3A-3C. It is assumed that the input source of the control means of FIGS. 3A-3C comprises a sinusoidal input signal similar to signal 201 shown in FIG. 2A. In its simplest form, shown in FIG. 3A, the energy control means 106 may comprise a transformer 301 having a controllable wiper 302 for varying the amplitude of the output signal. In this configuration, the turn ratio of the transformer 301 is varied in accordance with the control setting provided by the controller 114 of FIG. 1. As shown in FIG. 4A, the amplitude of the output signal is varied in direct proportion to the input signal. FIG. 4A shows two exemplary outputs of the transformer 301 in response to two different control settings.

In its more complex form shown in FIG. 3B, the energy control means 106 includes a switcher which chops the input signal at a substantially high switching rate (e.g. 100 Khz). A transformer 304 which may step-up or step-down the chopped signal provides the output signal at its secondary winding 311. A fixed capacitor 305 is coupled across the secondary winding 311 to form a resonant circuit for varying the amplitude of the output signal. The amplitude of the output will be controlled by controlling the switching rate of the input signal in accordance with the control setting provided by the controller 114 (FIG. 1) on line 310. It may be appreciated that because of a high switching rate, a small transformer and a small capacitor may be used to control the amplitude of the output signal.

In yet another arrangement shown in FIG. 3C, the duty cycle of the output signal is controlled instead of controlling its amplitude. A well-known pulse width modulator 307 is coupled to the input signal to provide an output signal having a variable duty cycle. The duty cycle of the output signal may be varied (via terminal 306) in response to the control setting provided by the controller 114 of FIG. 1. FIG. 4C shows a typical output 403 of the pulse width modulator 307 in response to a sinusoidal input signal. As shown, the duty cycle of the output signal sets its energy content and varies the duty cycle controls of energy content of the output signal.

According to the invention, a resistive load is presented by the power supply 100 by compensating output signal 108 only at the beginning points of each cycle and by maintaining control of the output signal constant until a subsequent beginning point. As will be described later, the subsequent beginning point may occur at the duration of a half cycle or of a full cycle. In contrast to prior art methods where the output signal is compensated instantaneously or very slowly, the present invention contemplates deferring any output compensation to the beginning points of each cycle. The instantaneous compensation of the output signal during a cycle may cause the instantaneous input current variations which are not followed by the input voltage. However, according to the present invention, because the beginning of each cycle coincides with null potential points, zero current is supplied by the input source at that point. Thus, any changes at that time would not effect the input current. Moreover, by maintaining the control of the output signal 108 constant during the entire cycle, no harmonic currents are created during that cycle. This arrangement, therefore, causes a resistive load to be presented to the energy source 102 which produces an optimum power factor for the power supply 100.

The output signal 108 is compensated by feeding back changes sensed by the sensor 116 to the controller which determines the proper control setting for the energy control means 106. Accordingly, the control setting is only varied at the beginning of a cycle and is maintained constant during that cycle. At the beginning point of the subsequent cycle, the controller 114 again determines the appropriate control setting based on the feedback signal 118 from the sensor and applies it to the energy control means 106 to compensate the output signal accordingly. The control setting is maintained constant during the subsequent cycle.

Sensing of the output voltage (or current) for providing the feedback signal 118 may be done synchronously to the cyclically varying voltage. For example, in the battery charger application, it is desired to sense the charging current when the cyclically varying supply voltage is at its peak point (points 204 or 205 of FIGS. 2A and 2B) so that the output signal may be controlled to provide an average battery charging current. Similarly, in order to avoid erroneous reading, it is desired to sense the voltage across the battery when the cyclically varying voltage is at a null potential point (e.g. beginning points 203 or 202 of FIG. 2). Therefore, depending on the application, sensing of the output signal 108 may be synchronized with either peak point 204 or null point 202 of the cyclically varying voltage. Alternatively, sensing may be nonsynchronous. For example, the temperature of the battery may be sensed in a nonsynchronous manner by taking random or periodic readings in order to adjust the output signal accordingly.

It may be appreciated that the principals of the present invention are applicable to any suitable cyclically varying voltage, such as sinusoidal signal, provided by the AC line (as shown in FIG. 2A) or a fullwave rectified signal produced by a bridge rectifier (as shown in FIG. 2B). In the case of a fullwave rectified signal, the beginning points occur at each full cycle. Therefore, the subsequent beginning point does not occur for the duration of an entire cycle. In case of a sinusoidal voltage, the beginning points repeat at each half cycle and comprise null potential points which may be used for varying the control setting without creating harmonic currents. Therefore, in this case, the control setting is varied at the beginning points 202 and is maintained constant until the subsequent beginning point which occurs within a half cycle. Accordingly, it is contemplated that the control setting be maintained constant during either an entire cycle or a half cycle depending on the input signal. It may be appreciated that the subsequent beginning point is not necessarily the next beginning point and may comprise any integer multiples of a previous beginning point.

Additionally, the principals of the invention are equally applicable to a cyclically varying input voltage which is riding on an average DC potential. In this way, the control setting may be varied only at the beginning of each cycle when the instantaneous cyclically varying input voltage is substantially equal to the average DC potential. Again, the control setting may be varied at half cycles if the cyclically varying voltage has DC voltage crossing points at each half cycle.

Referring to FIG. 5, a battery charger 500 which uses the principals of the present invention for charging a battery 520 is shown. In the preferred embodiment, the battery charger 500 includes a line energy source 501 for providing an AC line source 502. A bridge rectifier 503 is coupled to the source 501 to provide a rectified line signal 504. A well-known null-detector 505 detects the beginning points of each line cycle and provides a synchronization signal 506 to a well-known microcontroller 507. It may be appreciated that the null detector 505 may detect the beginning of each cycle either by determining the zero crossing point of the line source 502 or the zero potential of the rectified line signal 504. A well-known voltage detector 508 provides a digital representation of either the voltage across the battery 520, or via a resistor 509, the level of charging current output 510. According to the invention, the microprocessor provides a control setting (on line 511) to a pulse width modulator 512. The pulse width modulator 512, which comprises means for controlling energy, varies the pulse width of the charging current output 510 according to the control setting. It may be appreciated that instead of the pulse width modulator 512, any other means for controlling the energy, such as those described in conjunction with FIGS. 3A and 3B, may be used in the battery charger 500.

In conventional battery chargers, a filtering capacitor is coupled to the bridge rectifier 503 which provides a substantially DC (i.e., non-varying) charging current to the battery. However, as described previously, the filtering capacitor significantly increases the harmonic currents and produces inrush currents. The battery charger 500 of the present invention operates on the principal that the charging current need not be a non-varying current and that as long as the average current supplied to the battery is constant during one or more cycles, variations of the charging current within an entire line cycle are insignificant for charging purpose. Therefore, a varying charging current may be supplied by the charger 500 which eliminates the need for a filtering capacitor. For charge control purposes, however, the average charging current is maintained substantially constant during one or more entire cycles.

In the battery charger 500, battery voltage is sensed when substantially no charging current is supplied to the battery 520. This is because most accurate measurements of battery voltage are taken when no charging current is flowing into the battery 520. On the other hand, the charging current is monitored when maximum current is being supplied to the battery. Maximum current is supplied when peak point 205 of rectified line signal 504 is reached (see FIG. 2B). The sensing is synchronized by the microcontroller 507 in response to the synchronization signal 506 to make appropriate measurements. The microcontroller 507, based on the feedback signal from the voltage detector 508, provides an appropriate control setting to vary the pulse width of the output signal only at the beginning point of each cycle and maintains the control setting constant for at least a predetermined duration within the cycle.

It may be appreciated that by the elimination of the filtering capacitor, according to the present invention, the in-rush currents produced at initial powerup are totally eliminated. Furthermore, size and cost of the battery charger is reduced.

Additionally, timely output control, according to the principals of the present invention, can be used in a variety of power control applications. As a power controller, the output may be controlled such that a substantially resistive load is presented to the energy source which, unlike the power control circuits of the prior art, substantially reduces harmonic currents generated due to non-resistive load characteristics.

What is claimed is:

1. A power supply for providing an output having an input for receiving a cyclically varying supply voltage, the cyclically varying supply voltage having periodic beginning points, wherein at said beginning points the output changes do not effect supply current, comprising:

synchronization means for synchronizing with the beginning points of the cyclically varying supply voltage;

a controller means for providing a control setting; said controller means being responsive to the synchronization means for varying the control setting only at a beginning point, wherein the control setting is maintained constant until a subsequent beginning point; and an energy control means responsive to the control setting for controlling the output only at the beginning point.

2. The power supply of claim 1, wherein the energy control means comprises a pulse width modulator.

3. The power supply of claim 1, wherein the energy control means comprises an amplitude control means for controlling the output.

4. The power supply of claim 1, further including a sensing means for sensing a variable parameter which effects the output, wherein the controller means is also responsive to the sensing means for providing the control setting.

5. The power supply of claim 4, wherein the variable is sensed synchronous to the cyclically varying supply voltage.

6. The power supply of claim 1, wherein the control setting is maintained substantially constant for the duration of an entire cycle.

7. The power supply of claim 1, wherein the cyclically varying supply voltage comprises a substantially sinusoidal supply voltage.

8. The power supply of claim 7, wherein the control setting is maintained substantially constant for the duration of a half cycle.

9. The power supply of claim 7, wherein the cyclically varying input voltage comprises an AC line source.

10. The power supply of claim 9, further including a rectifier for rectifying the AC line source.

11. The power supply of claim 10, wherein the rectifier comprises a full-wave rectifier.

12. A charger for providing charging current for a battery having an input for receiving a cyclically varying supply voltage, the cyclically varying supply voltage having periodic beginning points, wherein at said beginning points the output changes do not effect supply current, comprising:

a rectifier means;

synchronization means for synchronizing with the beginning points of the cyclically varying supply voltage;

a controller for providing a control setting, said controller means being responsive to the synchronization means for varying the control setting only a beginning points, wherein the control setting is maintained constant until a subsequent beginning point; and an energy control means responsive to the control setting for controlling the output only at the beginning point.

13. The battery charger of claim 12, wherein the energy control means comprises a pulse width modulator.

14. The battery charger of claim 12, wherein the energy control means comprises an amplitude control means for controlling the charging current.

15. The battery charger of claim 12, further including a sensing means for sensing a variable parameter which effects the output, wherein the controller means is responsive to the sensing means for providing the control setting.

16. The battery charger of claim 15, wherein the sensing means senses the charging current.

17. The battery charger of claim 15, wherein the sensing means senses the voltage across the battery.

18. The battery charger of claim 15, wherein the sensing means senses temperature of the battery.

19. The battery charger of claim 15, wherein the variable is sensed synchronous to the cyclically varying supply voltage.

20. The power supply of claim 12, wherein the control setting is maintained substantially constant for the duration of an entire cycle.

21. The power supply of claim 12, wherein the cyclically varying supply voltage comprises a substantially sinusoidal supply voltage.

22. The power supply of claim 21, wherein the control setting is maintained substantially constant for the duration of a half cycle.

23. The power supply of claim 22, wherein the cyclically varying supply voltage comprises an AC line source.

* * * * *